United States Patent [19]

Perry

[11] Patent Number: 4,889,357
[45] Date of Patent: Dec. 26, 1989

[54] PARKING STAND FOR SUPPORTING THE TONGUE OF A PARKED TRAILER

[76] Inventor: John C. Perry, 3170 Falcon Dr., Carlsbad, Calif. 92008

[21] Appl. No.: 200,603

[22] Filed: May 31, 1988

[51] Int. Cl.⁴ .......................... B60S 9/08; B60S 13/00
[52] U.S. Cl. .................................... 280/475; 212/189; 248/352; 248/354.3; 254/420; 280/763.1; 280/766.1
[58] Field of Search ..................... 280/414.2, 463, 475, 280/507, 511, 763.1, 765.1, 766.1; 212/189; 254/420, 424, 94; 248/352, 354.3

[56] References Cited

U.S. PATENT DOCUMENTS

| | | | |
|---|---|---|---|
| 2,926,930 | 3/1960 | Pease | 280/475 |
| 3,238,678 | 3/1966 | Barnett | 52/155 |
| 3,779,579 | 12/1973 | Ostwald | 280/763.1 |
| 3,797,283 | 3/1974 | Honer | 70/58 |
| 3,857,575 | 12/1974 | Lee | 280/1 |
| 3,989,276 | 11/1976 | Hameri | 280/763.1 |
| 4,063,750 | 12/1977 | Mutchler | 280/475 |
| 4,141,526 | 2/1979 | John | 248/352 |
| 4,548,418 | 10/1985 | Wendorff | 280/1 |
| 4,674,726 | 6/1987 | Roux | 248/352 X |

FOREIGN PATENT DOCUMENTS

| | | | |
|---|---|---|---|
| 244218 | 11/1962 | Australia | 280/765.1 |
| 1050003 | 3/1979 | Canada | 248/352 |

Primary Examiner—Mitchell J. Hill
Attorney, Agent, or Firm—Donald R. Nyhagen

[57] ABSTRACT

A parking stand for supporting the tongue of a parked trailer. The parking stand has a coupling ball at its upper end for engagement in the socket of a coupling part on the front end of the trailer tongue and a castor wheel or fixed base at its lower end for supporting the stand on the ground. A clamp on the upper end of the stand acts against the trailer coupling part to secure the stand against swivel movement relative to the trailer tongue.

38 Claims, 2 Drawing Sheets

PARKING STAND FOR SUPPORTING THE TONGUE OF A PARKED TRAILER

BACKGROUND OF THE INVENTION

1. Field of the Invention

This invention relates generally to supports for parked trailers and more particularly to novel parking stand for the tongue of a parked trailer.

2. Prior Art

This invention is concerned with trailers, primarily recreational trailers, of the type having a frame with a front tongue which can be coupled to a towing vehicle for travel and must be supported in an elevated position when the trailer is uncoupled from the vehicle and parked. At the front end of this tongue is a coupling part to be engaged with a mating coupling part on the rear of the towing vehicle for connecting the trailer to the vehicle. The coupling part on the towing vehicle is an upstanding coupling ball having a projecting shank which is rigidly secured to the rear of the vehicle. The trailer coupling part comprises a rigid housing containing a downwardly opening cavity for receiving the coupling ball on the towing vehicle thru the open underside of the cavity and locking device for releasibly locking the coupling ball in the cavity.

A variety of coupling ball locking devices have been devised for such trailer couplings. A common type of coupling ball locking device comprises a lock member pivotally mounted in the housing of the trailer coupling part within a wall opening of the housing cavity for movement between locking and unlocking positions. When in its locking position, the lock member and the wall of the cavity form a generally spherical socket which is sized to rotatably receive the coupling ball on the towing vehicle. This socket has a bottom opening somewhat larger in diameter than the shank of the coupling ball on the towing vehicle but substantially smaller in diameter than the coupling ball proper. The ball may thus be locked in the socket with the ball shank extending thru the bottom opening of the socket to couple the trailer to the vehicle. When in its unlocking position, the lock member is retracted from the coupling housing cavity to enlarge the bottom opening of the socket to a size substantially larger than the towing vehicle coupling ball proper to permit engagement and disengagement of the trailer coupling part with and from the ball. Operatively connected to the lock member are manually operable means, such as a cam or screw for moving the lock member between its locking and unlocking positions and releasibly securing the lock member in its locking position.

One of the problems associated with a trailer of the character described resides in the fact that its longitudinal weight distribution is such that the trailer tongue must be supported in an elevated position when the trailer is uncoupled from the towing vehicle and parked. A variety of trailer parking stands for this purpose have been devised. Examples of such parking stands and other related trailer devices are described in the following patents:

U.S. Pat. No. 3,238,678: describes a trailer anchor having a top coupling ball to engaged in the trailer tongue coupling socket and a lower end to be inserted into the ground to retain the anchor upright.

U.S. Pat. No. 3,779,579: describes a rotatably extendable and retractable parking wheel support permanently mounted on a trailer tongue.

U.S. Pat. No. 3,797,283: describes a removable trailer tongue parking stand having an upper coupling ball which is engaged in the trailer tongue coupling socket and a lower auger which is screwed into the ground to both retain the support upright and prevent theft of the trailer.

U.S. Pat. No. 3,857,575: describes a trailer tongue parking stand having an upper coupling ball which is engaged in the trailer tongue coupling socket and a lower end which is permanently telescopically installed in a buried tube to both retain the support upright and prevent theft of the trailer.

U.S. Pat. No. 3,989,276: describes a trailer support in the form of a retractable jack stand to be permanently mounted on the trailer.

U.S. Pat. No. 4,063,750: describes a combined tow bar and parking stand for a trailer.

U.S. Pat. No. 4,548,418: describes a trailer tongue parking stand having an upper coupling ball for engagement in the trailer tongue coupling socket and a broad base for resting on the ground in a manner which normally retains the support upright.

Other commercially available trailer tongue parking stands are known, such as those manufactured by W. W. Gringer Inc., which have a vertical guide to be permanently secured to the trailer tongue and containing a tubular support member with a lower castor wheel which is vertically adjustable in the guide.

The above and other existing trailer tongue parking stands have certain disadvantages which this invention overcomes. The commercially available parking stands referred to above, for example, are quite heavy, costly and include at least one part, such as a guide, which is permanently mounted on the trailer. As a consequence, use of a stand of this type on a different trailer requires removal of the permanent part(s) from one trailer and mounting of such part(s) on the other trailer The above and other existing trailer tongue parking stands and related devices which have a coupling ball for engagement in a trailer tongue coupling socket are devoid of any part(s) which must be permanently mounted on the trailer and in this respect are an improvement over the stands which have such part(s). These coupling ball-type parking stands, however, suffer from other and perhaps more serious disadvantages. These disadvantages reside in or result from the lack of any means on the stands themselves and/or the trailer for securing the coupling balls of the stands against swivel movement in the trailer tongue coupling socket as is necessary for the stands to provide a stable trailer support.

Thus, the coupling ball on such a parking stand and a trailer tongue coupling socket in which the ball is engaged constitute a ball and socket coupling which normally permits substantial swivel movement of the ball in the socket and thereby substantial lateral angular movent of the stand relative to the trailer tongue. Unless this freedom of swivel and lateral movement is eliminated, of course, the parking stand will not provide a stable support for the trailer tongue, and any slight movement of the trailer will cause the stand to lean over and drop the tongue.

In the patents listed above, the ground is utilized, in effect, to prevent swivel movent of the coupling ball in the trailer tongue coupling socket and thereby secure the parking stand against lateral angular movement. This is accomplished by either placing the lower end of the stand in the ground, as in U.S. Pat. Nos. 3,238,678, 3,797,283, and 3,857,575 or by providing the stand with a broad base which rests on the ground surface to maintain the stand upright, as in U.S. Pat. No. 4,548,418.

None of the trailer parking stands described in the above patents which have a coupling ball for engagement in a trailer tongue coupling socket embody any mean acting between the stands and trailers themselves for securing the ball against swivel movement in the socket. This results in the existing parking stands of this type having the following distinct disadvantages. Such parking stands cannot be equipped with a castor wheel or the like to facilitate movement of the supported trailer from spot to another. Those stands which must be pushed into the ground cannot be used on paved, asphalt or other hard surfaces. Those stands which utilize a buried receptacle for receiving the lower end of the stand involve the time and cost of installing the receptacle and can be used only at receptacle locations. Some of the stands are difficult and time consuming to install.

Accordingly, there is a definite need for an improved trailer tongue parking stand of the type having a coupling ball for engagement in the coupling socket on the trailer tongue. This invention provides such an improved parking stand.

SUMMARY OF THE INVENTION

The improved trailer parking stand of this invention has a support member with normally upper and lower ends, a coupling ball at the upper end of the member, and ground engaging means at the lower end of the member. In use, the parking stand is placed below the front coupling part of the tongue of a parked trailer with the upper coupling ball of the stand engaged within the socket of the coupling part and the lower ground engaging means of the stand resting on the ground. According to an important feature of the invention, the parking stand is equipped with means which act between the stand and the trailer tongue to restrain the stand against swivel movement of its coupling ball in the trailer coupling socket and thereby rigidly secure the stand to the trailer tongue. In the preferred embodiment of the invention, this means for restraining the parking stand coupling ball against swivel movement in the trailer tongue coupling socket comprises means for clamping the upper end of the stand to the socket housing. The ground engaging means of the stand may be either a castor wheel or the like to permit movement of the parked trailer while supported on the stand or a fixed base.

Several embodiments of the invention are described. All of these embodiments are characterized by a clamp surface on the parking stand just below the upper coupling ball of the stand, and means for moving this clamp surface into and from clamping engagement with the underside of the trailer tongue coupling socket housing when the ball is locked within its coupling socket. When the coupling ball is thus locked within the socket, the socket restrains the ball against downward separation from the socket so that clamping engagement of the parking stand clamp surface with the under side of the socket housing firmly clamps the stand to the housing in a manner which positively restrains the ball against swivel movement in the socket and thereby rigidly secures the stand to the trailer tongue.

In the presently preferred embodiment of the invention, the support member is a tube with a fixed insert in one end. The coupling ball has a threaded shank coaxially threaded in this insert so that rotation of the support member or tube relative to the ball causes relative axial movement of the tube toward and away from the ball. The clamp surface of the stand is the upper surface of an annular washer-like clamp plate surrounding the coupling ball shank between the ball and the upper end of the support tube. Rotation of the tube in one direction relative to the ball when the latter is locked within a trailer tongue coupling socket moves the clamp plate into clamping engagement with the underside of the socket housing to rigidly secure the parking stand to the trailer tongue.

In a second disclosed embodiment, the clamp plate is eliminated, an the upper end surface of the support member forms the clamp surface for engaging the socket housing. Two additional embodiments are disclosed which are identical to two just mentioned except that the threaded shank is on the support tube and is threaded in the coupling ball. One additional embodiment of the invention is disclosed in which a threaded shank or shaft is fixed to both the support tube and coupling ball, and a clamp plate is threaded on the shaft for movement into and from clamping engagement with a trailer tongue socket housing by rotation of the plate on the shaft.

The improved trailer parking stand of the invention has many advantages over the parking stands and the like. Foremost among these advantages are these: relative simplicity and low cost, ease of installation and removal, capability of use anywhere and on any type of surface from relatively soft soil and sand to asphalt and concrete, absence of any part(s) required to be permanently installed on the trailer, and relatively compact size, light weight, and ease of storage when not in use.

DESCRIPTION OF THE PREFERRED EMBODIMENTS

Figure 1:
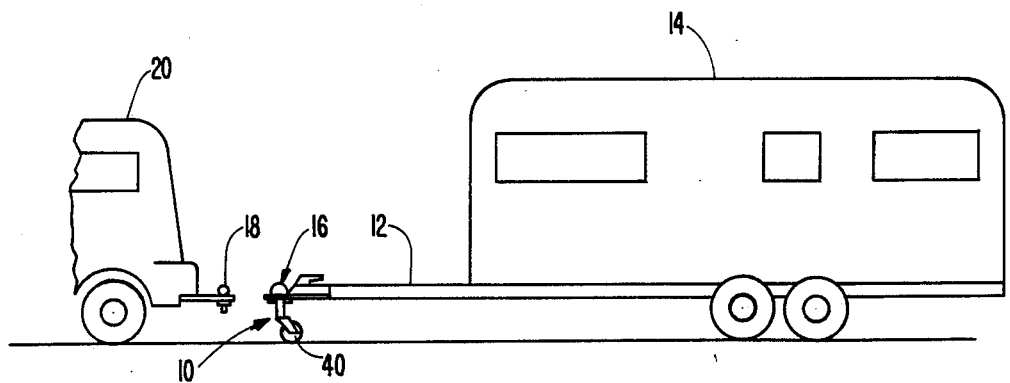
FIG. 1 illustrates a parking stand according to the invention supporting the tongue of a parked trailer.

Turning now to these drawings and first to FIGS. 1-4 thereof, there is illustrated a presently preferred parking stand 10 according to the invention supporting the tongue 12 of a parked trailer 14. Trailer 14 may be any type of trailer whose tongue 12 includes a front coupling part 16 for releasable coupling engagement with a mating coupling part 18 on the rear of a vehicle 20 for towing the trailer. The trailer 14, towing vehicle 20, and their mating coupling parts are conventional and thus need be described only in sufficient detail to enable a full and clear understanding of this invention.

The coupling part 18 on the towing vehicle 20 is an upstanding coupling ball which is rigidly mounted on the rear end of the vehicle. The coupling part 16 on the trailer 14 is a coupling socket part containing a generally spherical socket for receiving the vehicle coupling ball 18 in coupled or locked relation to couple the trailer to the vehicle for towing of the trailer by the vehicle. When the trailer is thus coupled to the towing vehicle, the trailer tongue 12 is vertically supported by the vehicle. When the trailer is uncoupled from the vehicle for parking the trailer, it is necessary to support the trailer tongue 12 in about the same elevated position above the ground as the tongue occupies when coupled to the vehicle. The present parking stand 10 provides this support for the tongue.

Before describing the parking stand 10, it is necessary to describe the trailer coupling part 16 in some detail even though this part is conventional. It worthwhile to mention here that there are various types of trailer coupling parts for connection to a coupling ball on a towing vehicle. The present improved parking stand can be used with most if not all of these various types which have certain common characteristics, as noted below. Only one of these conventional trailer coupling parts has been illustrated.

Figure 2:
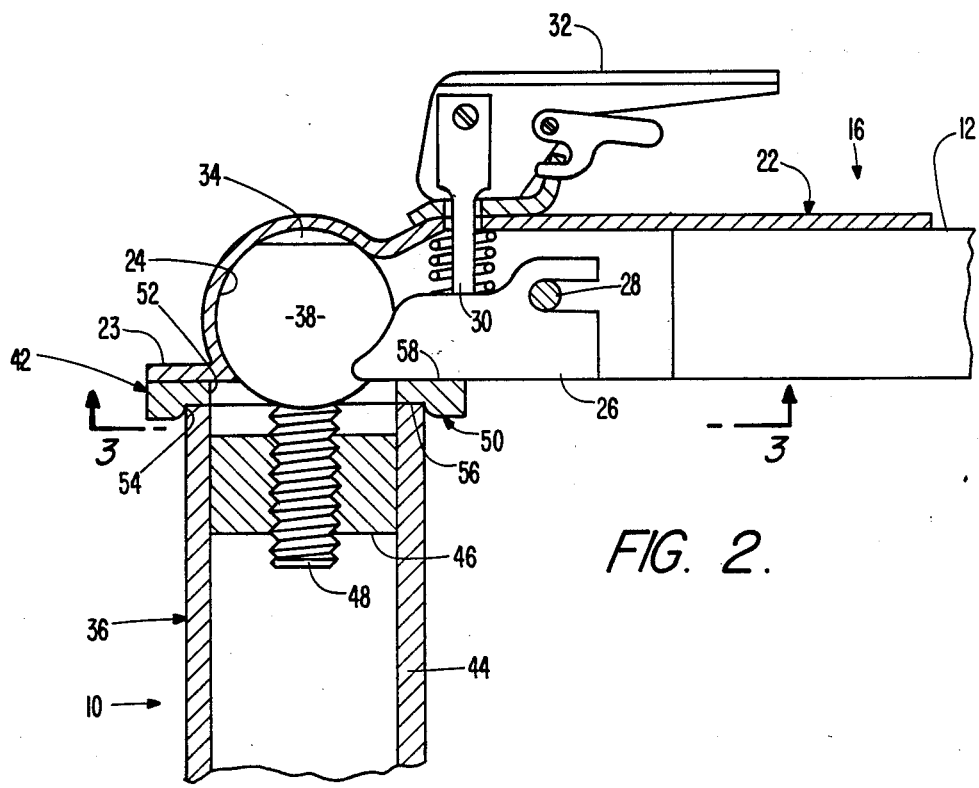
FIG. 2 is an enlarged vertical section, partly in side elevation, thru the trailer tongue coupling part and parking stand in FIG. 1.
Figure 3:
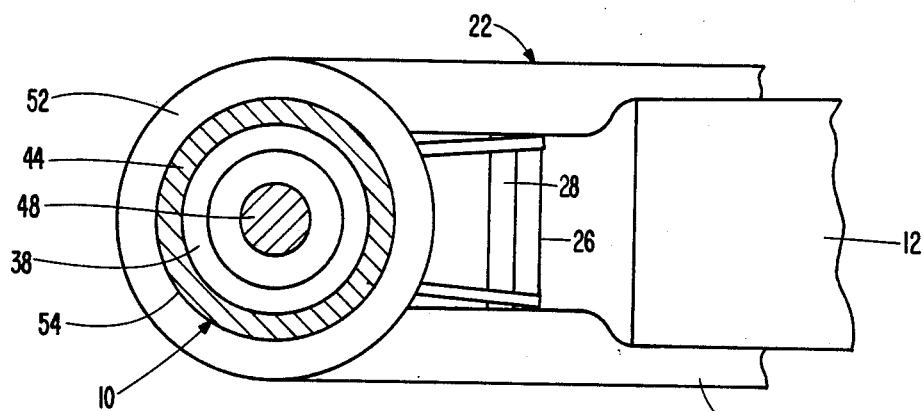
FIG. 3 is a section taken on line 3—3 in FIG. 2.

The illustrated trailer coupling part 16 comprises a strong hollow metal housing 22 having an open bottom bounded by an outwardly directed edge or flange 23 and an open rear end which is the right end in FIG. 2. The housing 22 s shaped to form at the front or left hand end of the housing a generally spherical cavity 24 which opens thru the bottom of the housing. The wall of this cavity, which is the wall of the housing 22, has in effect, a rear opening in which is situated a lock member 26. This lock member is pivotally mounted on a cross pin 28 in the housing and pivotally connected by a shaft 30 to a cam lever 32 on top of the housing. Cam lever 32 is rotatable between its locking position of FIG. 2 and an upright unlocking position to move the lock member 26 between its locking position of FIG. 2 and an unlocking position (not shown).

In its illustrated extended locking position, the lock member 26 forms, with the wall of the housing cavity 24, a generally spherical, downwardly opening coupling socket 34 for receiving the towing vehicle coupling ball 18 in locked relation within the socket, such that the ball can swivel in the socket but is locked or caged against downward separation from the socket. Rotation of the cam lever 32 to its upright unlocking position effects downward rotation of the lock member 26 by a spring to its retracted unlocking position wherein the bottom opening of the coupling socket 34 is enlarged sufficiently to permit passage of the coupling ball thru the bottom opening into and from the socket. Other trailer coupling parts utilize other means, such as a screw, to move the lock member between its locking and unlocking positions. As mentioned above, the parking stand of this invention may be used with most if not all of the various conventional trailer coupling parts.

Figure 4:
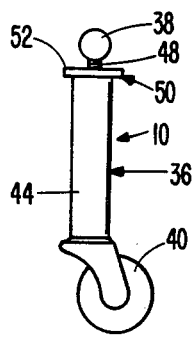
FIG. 4 is a side elevation on reduced scale of the parking stand in FIGS. 3-3.
Figure 5:
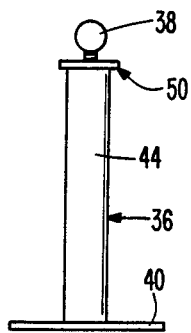
FIG. 5 is a side elevation on the same scale as FIG. 4 of a modified parking stand.

Proceeding now with a description of the improved parking stand 10, the stand comprises a support member 36 with normally upper and lower ends. At the upper end of the support member is a coupling ball 38 which may be similar to the coupling ball 18 on the towing vehicle 20. At the lower end of the support member is a ground engaging means 40 which may be a castor wheel or the like, as shown in FIG. 4, or a fixed base as shown in FIG. 5. In use, the stand is placed under the coupling part 16 of the tongue 12 on a parked trailer 14 with the upper coupling ball 38 of the stand engaged within the coupling socket 34 of the coupling part and the lower ground engaging means 40 of the stand resting on the ground. The ball is then locked in the socket.

According to a primary feature of the invention, the parking stand 10 includes means 42 which acts between the stand and the trailer tongue 12 to restrain or secure the coupling ball 38 against swivel movement in the trailer coupling socket 34 and thereby rigidly secure the stand against lateral angular movement relative to the tongue. The securing means 42 comprises means for rigidly clamping the stand to the housing 22 of the trailer coupling part 16 in a manner which prevents swivel movement of the ball in the socket.

Because the parking stand 10 is secured against swivel movement of its coupling ball 38 in the trailer tongue coupling socket 34 by means acting between the stand and the trailer tongue 12, the parking stand possesses the advantages mentioned earlier. As noted, one of these advantages resides in the fact that the stand may mount a castor wheel or the like to permit movement of a parked trailer while it is supported on the stand.

Referring now in more detail to the illustrated parking stand 10, its support member 36 comprises a support tube 44. Fixed within the upper end of this tube, a small distance below the upper end edge of the tube, is an insert 46. The coupling ball 38 has an integral, coaxial threaded shank 48 which is coaxially threaded in the insert 46. Rotation of the support tube 44 relative to the ball 38 is thus effective to move the tube axially toward and away from the ball.

Surrounding the coupling ball shank 48, between the ball 38 and the support tube 44, is a an annular washer-like clamp collar or clamp plate 50 having a central opening 52 substantially larger than the shank. The lower end of opening 52 is counterbored at 54 to slidably receive the upper end of the support tube 44 and form an internal shoulder 56 for seating on the upper end edge of the tube. The upper surface 58 of the clamp plate 50 functions as a clamp surface. As will appear from the description below, the mating threads on the support tube insert 46 and ball shank 48 and the clamp plate 50 constitute the clamping means 42 for clamping the parking stand 10 to the trailer tongue coupling part 16.

In use, the parking stand is placed below the trailer tongue coupling part 16 with the coupling ball 38 of the stand locked within the coupling socket 34 of the part and with the ground engaging means 40 of the stand resting on the ground, as explained earlier. The support member 36, that is the support tube 44, is then rotated in a direction to draw the trailer tongue coupling part downwardly and firmly against the clam plate 50. The support tube is thus rotated sufficiently to place the upper clamp surface 58 of the clamp plate in firm clamping engagement with the underside of the trailer coupling socket housing 22. The parking stand 10 is thereby rigidly secured to trailer tongue 12 in a manner which prevents swivel movement of the coupling ball 38 in the trailer coupling socket 34 and enables the stand to provide a rigid support for the tongue. The use of a castor wheel 40 or the like on the stand permits the supported trailer to be easily moved.

In some cases, the coupling ball 38 of the parking stand 10, when firmly locked in the trailer coupling socket 24, may project slightly below the underside of the trailer coupling socket housing 22. The enlarged (relative to the ball shank 48) opening 52 in the clamp plate 50 is sized to provide clearance for such a projecting ball and thereby permit firm clamping engagement of the plate with the underside of the socket housing. Because of its enlarged opening, the clamp plate 50 has a very loose fit on the coupling ball shank 48. As a consequence, it is necessary to maintain the clamp plate in coaxial alignment with the support tube 44 and coupling ball 38 during the above described installation of the parking stand. The upper end of the support tube 44 and the lower counterbore 54 in the clamp plate 50 which receives the upper tube end together form alignment means for retaining the clamp plate in coaxial alignment with the coupling ball shank during installation of the stand. If desired, the clamp plate 50 may be retained in such coaxial alignment with the coupling ball shank 48 by welding or otherwise permanently securing the clamp plate to the support tube 44.

The modified parking stands of FIGS. 6–9 are identical to and used in the same way as the parking stand of FIGS. 1–5 except as noted in the following description. In the parking stand 10a of FIG. 6, the separately formed support tube 44, tube insert 46, and clamp plate 50 of FIGS. 1–5 are replaced by a clamp plate 50a integrally formed at the upper end of a solid support member 36a and having an upper clamp surface 58a and a recess 52a. Recess 52a is the same diameter as and serves the same purpose as the large opening 52 in the clamp plate 50 of FIGS. 1–5, i.e. to provide clearance for the coupling ball 38a if it projects below the trailer coupling socket. The shank 48a of the coupling ball 38a is threaded directly in the upper end of the solid support member. When installing the parking stand 10a on the trailer tongue 12, the support member 36a is rotated in a direction to move the clamping surface 58a, which is actually the upper end surface of the support member, into clamping engagement with the underside of the trailer tongue coupling socket housing 22.

Figure 8:
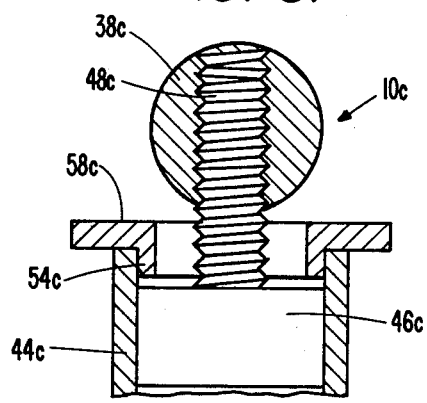
FIGS. 6 thru 9 are fragmentary vertical sections thru the upper ends of further modified trailer parking stands according to the invention.
Figure 6:
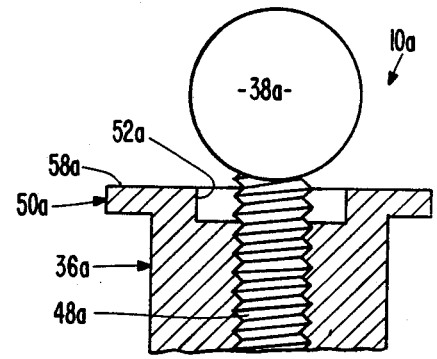
Figure 7:
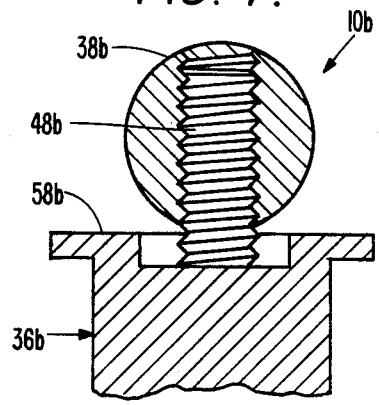

The modified parking stands 10b and 10c of FIGS. 7 and 8 are identical to the parking stands 10 and 10a of FIGS. 1–5 and 6, respectively, except in the following respects. The threaded coupling ball shanks 48, 48a of the stands 10, 10a are replaced in FIGS. 7 and 8 by threaded shanks 48b, 48c which are rigidly joined to or integral with the support member 36b and support tube insert 46c, respectively, and threaded in the coupling balls 38b, 38c of the stands. In addition, the clamp plate 50c of FIG. 8, rather than being counterbored like the clamp plate 50 in FIGS. 1–5, has a lower coaxial flange 54c which fits slidably within the upper end of the support tube 44c to retain the support plate in coaxial alignment with the tube and ball. The clamp surfaces 58b, 58c of the stands 10b, 10c are moved into clamping engagement with the trailer coupling socket housing 22 by rotating the support member or support tube in the same manner as in the other parking stands In the modified parking stand 10d of FIG. 9, the threaded ball and support shanks of FIGS. 1–8 are replaced by a threaded shank 48d, perhaps more accurately called a shaft, which is rigidly joined to both the coupling ball 38d and the support tube insert 46d. A washer-like clamp plate 50d is threaded on the shaft 48d for movement into clamping engagement with the trailer socket housing 22 by rotation of the plate on the shaft. The upper clamp surface 58d of the clamp plate 50d has a recess 52d to provide clearance for the bottom of the coupling ball 38d in the event it projects below the socket housing.

In all of the described embodiments of parking stand, the friction between the parking stand coupling ball and the trailer coupling socket is sufficient to restrain the ball against turning with the support member or tube when the latter is rotated to secure the stand to and release the stand from the trailer tongue.

Figure 9:
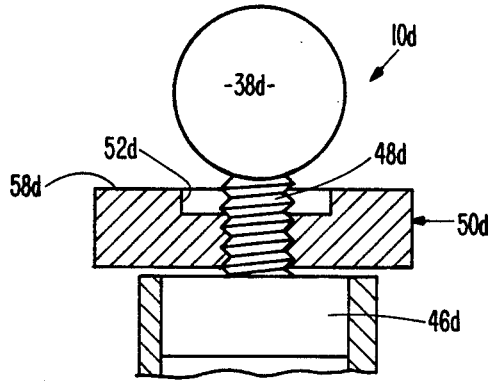

Moreover, in all of the described embodiments, when the parking stand is disposed in its normal upright trailer tongue supporting position below the coupling part on the tongue of a parked trailer with the parking stand firmly clamped to the trailer tongue coupling part, the portion of the parking stand which provides the clamp surface that engages the trailer coupling part, i.e. the clamp collars or clamp plates 50, 50c, 50d in FIGS. 2, 8, and 9, respectively, and the upper end surfaces 58a, 58b in FIGS. 6 and 7, respectively, is essentially a fixed shoulder disposed in firm contact with the trailer coupling part.

I claim:

1. A parking stand for supporting the tongue of a parked trailer, wherein the tongue mounts a front coupling part containing a coupling ball-receiving coupling socket having a normally lower open side bounded by an edge of the coupling part, and means for clamping a coupling ball in the socket, said stand comprising:
   an elongate support means having normally upper and lower ends,
   a coupling ball means at the upper end of said support means to be clamped within said coupling socket of the trailer tongue coupling part,
   a shank coaxially joining said coupling ball means and the upper end of said support means,
   means providing a clamp surface about and in a transverse plane of said shank,
   ground engaging means on the lower end of said support means, and wherein
   (a) said parking stand is adapted to be placed in a generally upright trailer tongue supporting position below the tongue of a parked trailer wherein said coupling ball means is uppermost and clamped within the coupling socket of the trailer coupling part, said clamp surface is located below and faces upwardly toward said edge of the trailer coupling part, and said ground engaging means engages the ground to support trailer tongue in an elevated position above the ground,
   (b) said coupling ball means and said clamp surface are relatively movable toward and away from one another longitudinally of said shank, and
   (c) said parking stand includes means for effecting relative movement of said coupling ball means and said clamp surface toward one another longitudinally of said shank to engage said clamp surface firmly against said edge of the trailer coupling part when said parking stand occupies said trailer tongue supporting position, thereby to secure said parking stand against lateral swivel movement relative to the trailer tongue.

2. A trailer tongue parking stand according to claim 1 wherein:
   one of said coupling ball means, support means, and means providing a clamp surface is a threaded member which is movable along said shank to effect relative movement of said coupling ball means and said clamp surface longitudinally of said shank, and
   said means for effecting relative movement of said coupling ball means and clamp surface toward one another comprises engaging screw threads on said shank and said threaded member.

3. A trailer tongue parking stand according to claim 2 wherein:
one of said coupling ball means and support means is said threaded member, and
said means providing a clamp surface comprises an annular clamp plate about and freely movable along said shank between said coupling ball means and the upper end of said support means.

4. A trailer tongue parking stand according to claim 3 wherein:
said support means is said threaded member.

5. A trailer tongue parking stand according to claim 3 wherein:
said coupling ball means is said threaded member.

6. A trailer tongue parking stand according to claim 2 wherein:
one of said coupling ball means and support means is said threaded member, and
said means providing a clamp surface comprises an upper end surface of said support means.

7. A trailer tongue parking stand according to claim 6 wherein:
said support means is said threaded member.

8. A trailer tongue parking stand according to claim 6 wherein:
said coupling ball means is said threaded member.

9. A trailer tongue parking stand according to claim 3 wherein:
said means providing a clamp surface is said threaded member and comprises an annular clamp plate threaded on said shank.

10. A trailer tongue parking stand according to claim 1 wherein:
said clamp surface has an opening about and substantially larger in diameter than said shank and into which said coupling ball may protrude.

11. A trailer tongue parking stand according to claim 1 wherein:
said support means comprises a support tube and an insert fixed in the upper end of said support tube, and
said shank joins said insert and said coupling ball means.

12. A parking stand for supporting the tongue of a parked trailer, wherein the tongue mounts a front coupling part containing a coupling ball-receiving coupling socket having a normally lower open side bounded by an edge of the coupling part, and means for clamping a coupling ball in the socket, said stand comprising:
an elongate support member having normally upper and lower ends,
a coupling ball member at the upper end of said support member to be clamped within the trailer tongue coupling socket,
a threaded shank coaxially fixed at one end to one of said coupling ball and support members and coaxially threaded at the other end in the other of said coupling ball and support members, whereby said coupling ball member and said support member are relatively movable toward and away from one another longitudinally of said shank by relative rotation of said coupling ball member and said support member,
means providing a clamp surface at the upper end of said support member which surrounds said shank in a transverse plane of the shank and is relatively movable with said support member toward and away from said coupling ball member by relative rotation of said coupling ball member and said support member,
ground engaging means on the lower end of said support member, and wherein
(a) said parking stand is adapted to be placed in a generally upright trailer tongue supporting position below the trailer tongue coupling part of a parked trailer wherein said coupling ball member is clamped within the coupling socket of the trailer coupling part, said clamp surface is disposed below and faces upwardly toward said edge of the trailer coupling part, and said ground engaging means engages the ground to support the trailer tongue in an elevated position above the ground, and
(b) said coupling ball member and said support member are relatively rotatable in one direction to engage said clamp surface firmly against said edge of the trailer coupling part when said parking stand occupies said trailer tongue supporting position, thereby to secure said parking stand against lateral swivel movement relative to the trailer tongue.

13. A trailer tongue parking stand according to claim 12 wherein:
said clamp surface has an opening about and substantially larger in diameter than said shank into which said coupling ball member may protrude.

14. A trailer tongue parking stand according to claim 12 wherein:
said means providing a clamp surface comprises an annular clamp plate about said shank between said coupling ball member and the upper end of said support member and freely movable along said shank relative to both said coupling ball member and said support member.

15. A trailer tongue parking stand according to claim 12 wherein:
said means providing a clamp surface comprises an upper end surface of said support member.

16. A trailer tongue parking stand according to claim 12 wherein:
said shank is fixed to said coupling ball member and threaded in said support member.

17. A trailer tongue parking stand according to claim 12 wherein:
said shank is fixed to said support member and threaded in said coupling ball member.

18. A trailer tongue parking stand according to claim 12 wherein:
said support member comprises a support tube and an insert fixed in the upper end of said support tube, and
said shank joins said insert and said coupling ball member.

19. A parking stand for the tongue of a parked trailer, wherein the tongue mounts a coupling part containing a coupling ball-receiving coupling socket having a normally lower open side bounded by an edge of the coupling part, and means for clamping a coupling ball in the coupling socket, said parking stand comprising:
an elongate support having normally upper and lower ends,
a coupling ball at the upper end of and coaxial with said support to be clamped within the trailer coupling socket,
a threaded shank coaxially joining said support and coupling ball, a clamp plate threaded on said shank between said coupling ball and the upper end of said support, whereby rotation of said clamp plate on the shank moves the clamp plate along the shank, ground engaging means on the lower end of said support, and wherein (a) said parking stand is adapted to be placed in a generally upright trailer tongue supporting position below said coupling part on the tongue of a parked trailer wherein said coupling ball is clamped within the coupling socket of the trailer coupling part, said clamp plate is located below the trailer coupling part, and said ground engaging means engaging the ground to support the trailer tongue in an elevated position above the ground, and (b) said clamp plate is rotatable in one direction on said shank to move the clamp plate along the shank toward said coupling ball and place said clamp plate in firm clamping engagement with said edge of the trailer coupling part when said parking stand occupies said trailer tongue supporting position, thereby to secure said parking stand against lateral swivel movement relative to the trailer tongue.

20. A trailer tongue parking stand according to claim 19 wherein:

said support comprises a support tube and an insert fixed in the upper end of said support tube, and said shank joins said insert and said coupling ball.

21. In combination for coupling the tongue of a parked trailer to a parking stand for supporting the tongue in an elevated position above the ground:

a trailer coupling part to be mounted on the front end of the trailer tongue and containing a coupling ball-receiving coupling socket having an open side bounded by an edge of the trailer coupling part, and means for clamping a coupling ball within said coupling socket, and a parking stand coupling part including a shank, a coupling ball on one end of said shank to be clamped within said coupling socket with said shank projecting through said open side of the socket, and means for securing said parking stand coupling part against swivel movement laterally of said shank relative to said trailer coupling part when said coupling ball is clamped in said coupling socket of said trailer coupling part comprising a shoulder surrounding and disposed in a transverse plane of said shank, and means retaining said shoulder in contact with said edge of said trailer coupling part about a major portion of the open side of said coupling socket when said coupling ball is clamped within said coupling socket.

22. The combination of claim 21 wherein:

said means retaining said shoulder in contact with said edge of said trailer coupling part comprises means for effecting relative movement of said shoulder and said coupling ball longitudinally of said shank and thereby relative movement of said shoulder into and from clamping engagement with said trailer coupling part edge when said coupling ball is clamped within said coupling socket in the trailer coupling part.

23. The combination of claim 22 wherein:

said shoulder comprises an annular clamp plate surrounding and freely movable along said shank, and said means for effecting relative movement of said coupling ball and said shoulder longitudinally of said shank comprises means threaded on said shank and engaging said clamp plate for effecting movement of said clamp plate along said shank.

24. The combination of claim 22 wherein:

said shoulder is movable along said shank toward and away from said coupling ball, and said means for effecting relative movement of said coupling ball and said shoulder longitudinally of said shank comprises engaging screw threads on said shank and shoulder, whereby said shoulder and coupling ball are relatively movable toward and away from one another by rotation of said shoulder on said shank.

25. The combination of claim 21 wherein:

said shoulder has an opening about and substantially larger in diameter than said shank into which said coupling ball may protrude.

26. In combination:

a parked trailer having a tongue mounting a front coupling part containing a coupling ball-received coupling socket having a normally lower open side bounded by an edge of the trailer coupling part, and means for clamping a coupling ball within the socket, and a parking stand for supporting said trailer tongue in an elevated position above the ground comprising an elongate support means having normally upper and lower ends, a coupling ball means at the upper end of said support means to be clamped within said coupling socket of the trailer tongue coupling part, a shank coaxially joining said coupling ball means and the upper end of said support means, means providing a clamp surface about and in a transverse plane of said shank, and ground engaging means on the lower end of said support means, and wherein (a) said parking stand has a normally upright trailer tongue supporting position below the tongue of said parked trailer wherein said coupling ball means is uppermost and clamped within the coupling socket of the trailer coupling part, said clamp surface is located below and faces upwardly toward said edge of the trailer coupling part, and said ground engaging means engages the ground to support trailer tongue in an elevated position above the ground, (b) said coupling ball means and said clamp surface are relatively movable toward and away from one another longitudinally of said shank, and (c) said parking stand includes means for effecting relative movement of said coupling ball means and said clamp surface toward one another longitudinally of said shank to engage said clamp surface firmly against said edge of the trailer coupling part when said parking stand occupies said trailer tongue supporting position, thereby to secure said parking stand against lateral swivel movement relative to trailer tongue.

27. A combination according to claim 26 wherein:

one of said coupling ball means, support means, and means providing a clamp surface is a threaded member which is movable along said shank to effect relative movement of said coupling ball means and said clamp surface longitudinally of said shank, and said means for effecting relative movement of said coupling ball means and said clamp surface toward one another comprises engaging screw threads on said shank and said threaded member, whereby relative rotation of said threaded member and said shank moves the threaded member along said shank.

28. A combination according to claim 27 wherein:
one of said coupling ball means and support means is said threaded member, and
said means providing a clamp surface comprises an annular clamp plate about and freely movable along said shank between said coupling ball means and the upper end of said support means.

29. A combination according to claim 28 wherein:
said support means is said threaded member.

30. A combination according to claim 28 wherein:
said coupling ball means is said threaded member.

31. A combination according to claim 27 wherein:
one of said coupling ball means and support means is said threaded member, and
said means providing a clamp surface comprises an upper end surface of said support means.

32. A combination according to claim 31 wherein:
said support means is said threaded member.

33. A combination according to claim 31 wherein:
said coupling ball means is said threaded member.

34. A combination according to claim 27 wherein:
said means providing a clamp surface is said threaded member and comprises an annular clamp plate threaded on said shank.

35. A combination according to claim 26 wherein:
said clamp surface has an opening about and substantially larger in diameter than said shank and into which said coupling ball may protrude.

36. A coupling part for a parking stand for supporting the tongue of a parked trailer wherein the tongue mounts a coupling part having a coupling ball-receiving coupling socket and means for clamping a coupling ball within the coupling socket, said parking stand coupling part comprising:
a coupling ball member to be clamped in said coupling socket,
a shank extending coaxially from said ball member,
a clamp member about said shank having a clamp surface transverse to said shank and facing said ball member, and
means for effecting relative movement of said coupling ball member and clamp member toward and away from one another longitudinally of said shank.

37. A parking stand coupling part according to claim 36 wherein:
said clamp member comprises an annular clamp plate movable along said shank, and
said means for effecting relative movement of said coupling ball member and said clamp member toward and away from one another comprises means threaded on said shank and engaging said clamp plate for moving said clamp plate along said shank upon relative rotation of said shank and said means threaded on the shank.

38. A parking stand coupling part according to claim 36 wherein:
one of said coupling ball and clamp members is a threaded member movable along said shank, and
said means for effecting relative movement of said coupling ball member and said clamp member toward and away from one another comprises mating threads on said shank and said threaded member.

* * * * *